Jan. 1, 1963    F. R. RHODES    3,071,149
MECHANICAL CLEANING VALVE CONSTRUCTION
Filed Dec. 3, 1959
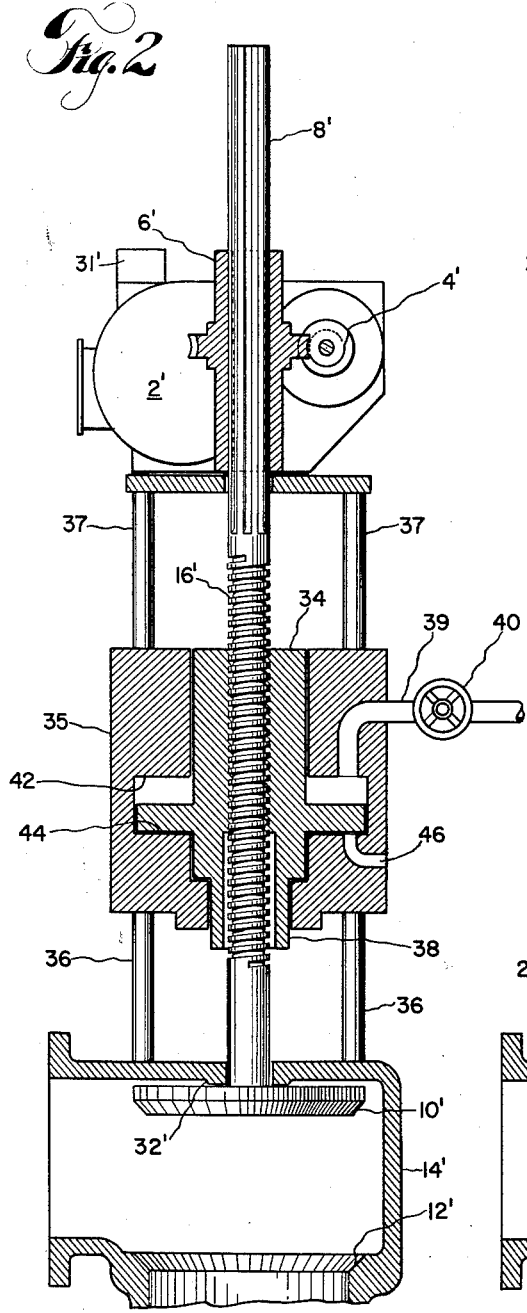
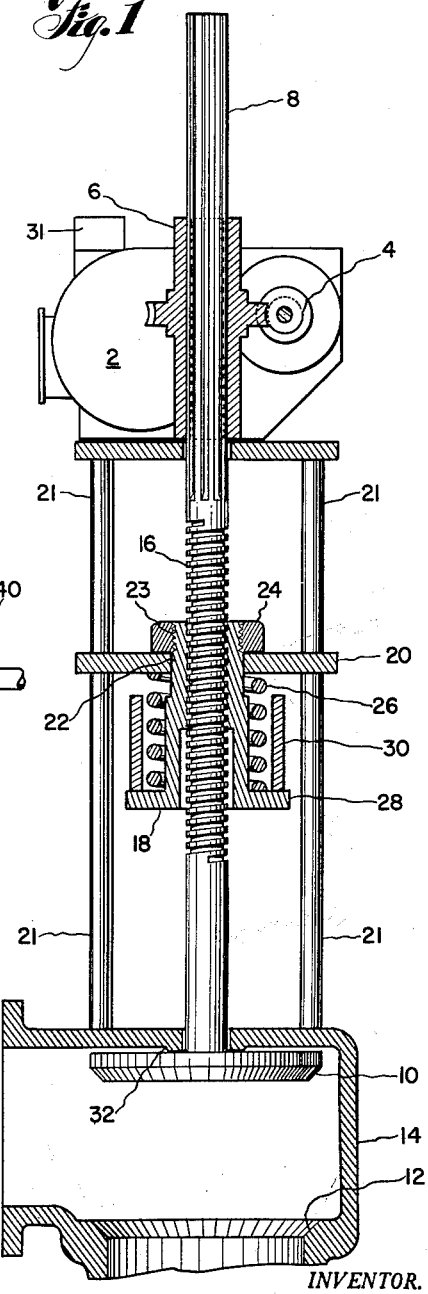
INVENTOR.
FRANK R. RHODES
BY
ATTORNEY United States Patent Office 3,071,149
Patented Jan. 1, 1963

3,071,149
MECHANICAL CLEANING VALVE
CONSTRUCTION
Frank R. Rhodes, Pittsburgh, Pa., assignor to Aluminum Company of America, Pittsburgh, Pa., a corporation of Pennsylvania
Filed Dec. 3, 1959, Ser. No. 857,105
4 Claims. (Cl. 137—243.3)

This invention relates to a valve construction, and more particularly is directed to a powered rotatable valve assembly.

During flow of solutions and slurries through pipe lines having valves therein of a type in which the valve disc is movable toward and from a seat to close and open the valve, foreign matter deposits on the valve seat and disc and impairs the sealing action of the valve. Normal operations must be interrupted in order to remove the scale accumulations. Consequently, as far as I am aware, the automatically powered valves have not achieved commercial importance for use in pipe assemblies where this condition prevails.

It is therefore an object of the invention to provide a powered rotatable valve which will substantially eliminate the accumulation of foreign matter and scale deposits on the valve disc and seat.

It is a more specific object of the invention to provide a powered rotatable valve which will grind on its seat during seating action, thereby removing any foreign matter or scale deposits from the valve and valve seat which would otherwise impair the firm sealing of the valve.

It is still a further object of the invention to provide a torque responsive means for controlling the rotatable grinding movements of the valve disc during seating action.

These together with other objects and advantages of the present invention will best be understood by referring to the following detailed specification and preferred embodiments thereof, and the accompanying drawing. In the drawing:

FIGURE 1 is a sectional elevation through a motor operated valve assembly embodying the invention.

FIGURE 2 is a sectional elevation of a modified form of the valve assembly falling within the scope of the invention.

In general, the power operated valve of the present invention includes a motor of any preferred construction provided with a suitable torque-limit switch responsive to a predetermined torque created on the motor. Geared driving means operated by the motor rotates the valve stem and valve disc during their movement in valve opening and valve closing directions. The valve stem is threaded through a reciprocably and non-rotatably mounted sleeve biased toward the valve body, whereby rotation of the valve stem effects axial translation of the stem relative to the valve body. Rotation of the stem and disc by the driving means moves the disc into contact or registration with the valve seat. As the valve disc engages the seat, the continued rotation of the stem causes movement of the sleeve along the valve stem against the action of the bias, until a stop means engageable by the sleeve terminates such movement. The torque imposed on the motor by the valve stem then rises rapidly, actuating the torque-limit switch to stop the motor. The rotation of the valve disc as it abuts the seat against the positive pressure of the bias transmitted through the sleeve and valve stem provides a grinding action of the valve disc on its seat to remove scale or deposits from the disc and seat and to assure a firm sealing action.

Referring to FIG. 1, motor unit 2 supplied with energy from any suitable source (not shown) drives a worm gear 4 meshing with splined sleeve 6 for rotating the same. Valve stem 8 is interengaged at its upper end with the splined sleeve 6. Valve disc 10, rigidly connected to the stem 8, is arranged to cooperate with the valve seat 12 of the valve body 14. Thus, rotation of the splined sleeve 6 by the gear 4 rotates the stem 8 for movement of the disc 10 to and from registration with the seat 12.

The steam has a threaded portion 16 extending through an internally threaded sleeve 18 slidably mounted in a fixed crosshead 20 for movement relative to the valve stem. The crosshead 20 is carried by the columns 21. The square shank portion 22 of the sleeve is keyed in the crosshead 20 to hold the sleeve against rotation. The upper end of the sleeve is externally threaded at 23 to engage with the internally threaded collar 24 for adjusting the axial travel distance of the sleeve and for retaining the sleeve in position. Surrounding the sleeve, and abutting the fixed crosshead at one end, is coil spring 26. The opposite end of the coil spring is supported by the flange or seat 28 of sleeve 18. Spring 26 biases sleeve 18 downwardly relative to the fixed crosshead. Extension or detent 30, carried by the sleeve 18 intermediate its ends and preferably extending transversely from the flange 28, is normally spaced from the fixed crosshead. Upon movement of the sleeve toward the crosshead the extension or detent engages the fixed crosshead, thereby arresting the movement of the nut as explained in greater detail hereinbelow.

In operation, the motor unit 2 is run to rotate the stem 8 in a direction to move valve disc 10 toward seat 12. Rotation of the stem through the threadedly engaged sleeve 18 effects axial translation of the stem relative to the valve body 14 to close the valve. As the valve disc 10 rotatably engages the valve seat 12, the rotation of the stem causes the sleeve 18 to move upwardly relative to the valve stem until the extension 30 strikes the crosshead 20, such movement being resisted by the coil spring. The continued rotation of the valve stem causes the valve disc to grind on the seat 12. The spring-loaded sleeve 18 thus exerts a pressure on the valve during rotation of the valve against the valve seat. The force exerted by the spring may be predetermined so as to resist the upward movement of the sleeve until the valve disc engages its seat. When such predetermined force is exceeded, the sleeve 18 moves upwardly relative to the stem 8, the spring being compressed between the fixed crosshead 20 and flange 28. As the sleeve 18 moves upwardly, extension 30 engages the fixed crosshead. Thereupon the torque on the motor unit 2 rises rapidly and the torque-limit switch 31 is operated to stop the motor.

In opening the valve, the direction of the motor is reversed, thereby rotating the stem in the opposite direction. The valve disc disengages from its seat in a self-grinding manner similar to the valve closing operation. Continued rotation of the stem moves the spring-loaded sleeve downwardly until collar 24 engages the crosshead 20, and the stem then moves axially in a valve opening direction. When the valve disc abuts shoulder 32 a torque is created sufficient to stop the motor.

The embodiment illustrated in FIG. 2 incorporates a pneumatic or hydraulic cylinder as means to control the self-grinding movements of the valve. The threaded portion 16' of the stem 8' extends through a threaded piston 34 slidably mounted in a fixed cylinder 35 for axial movement relative to the valve stem. The cylinder is carried by the columns 36 and 37. The lower portion 38 of the piston 34 is square and is keyed in the cylinder 35 to prevent the piston from rotating. Compressed air, or other suitable fluid, admitted to the cylinder through the line 39 and the valve 40, such as a check valve, biases the piston downwardly during movement of the valve disc 10' toward the seat 12'.

During the valve closing operation, the air inlet valve 40 is closed. As the valve disc 10' rotatably engages its seat 12' and grinds against it, the continued rotation of the stem causes the piston 34 to move upwardly. As in the case with the spring-loaded sleeve, the upward movement of the piston is resisted by a predetermined pressure of air until the valve disc 10' engages its seat. When such pressure is exceeded, the piston 34 moves upwardly relative to the stem 8', thereby compressing the air in the cylinder. According to one modification, the air pressure increases rapidly during the upward movement of the piston, and a predetermined level of pressure, serving as a stop means, will arrest the upward movement of the piston. The torque on the motor unit 2' then rises rapidly so as to trip the torque-limit switch 31' to stop the motor. Rather than allowing for the compression of the fluid to arrest the upward movement of the piston, the assembly may be further modified so that the piston moves upwardly until it engages the cylinder head 42, the valve stem thereupon imposing the increased torque for shutting off the motor.

The valve opening operation would be substantially the reverse, as explained above in the case with the spring mechanism. Piston 34 moves downwardly until it engages shoulder 44 of the cylinder. The cylinder is preferably provided with air vent 46 to prevent any build-up of air pressure between the piston and shoulder 44 which would interfere with the proper downward movement of the piston.

Having thus described the invention generally and in terms of specific embodiments thereof, I claim:

1. In a valve assembly comprising a valve body having a valve seat, a valve rigidly connected to a rotatably mounted valve stem for moving said valve to and from registration with said valve seat, a motor for rotating the said valve stem to effect the said movement of said valve, means for shutting off said motor in response to a predetermined increased torque on the said motor, a sleeve forming a piston threadedly engaged with said valve stem and mounted against rotation for relative movement between said stem and said piston upon registration of said valve with said valve seat, a stop engageable by the said piston for arresting movement of said piston away from said valve while said valve rotates against said valve seat, whereby further rotation of the valve against the valve seat effects an increased torque on said motor sufficient to shut off same, a cylinder accommodating said piston and having a compressed fluid to bias said piston downwardly relative to said cylinder and to exert pressure on said valve through said piston and said valve stem during rotation of the said valve against the said valve seat.

2. A valve assembly according to claim 1 wherein said stop means comprises a predetermined level of compressed fluid.

3. A valve assembly according to claim 1 wherein said stop means comprises the cylinder head.

4. A valve assembly according to claim 1 wherein said fluid comprises air.

References Cited in the file of this patent

UNITED STATES PATENTS

| 616,275 | Swenson | Dec. 20, 1898 |
| 916,831 | Bettinger | Mar. 30, 1909 |
| 2,005,891 | Elberty | June 25, 1935 |
| 2,598,062 | Krecan | May 27, 1952 |

FOREIGN PATENTS

| 811,640 | Great Britain | Apr. 8, 1959 |